(12) United States Patent
Ninan et al.

(10) Patent No.: US 8,386,732 B1
(45) Date of Patent: Feb. 26, 2013

(54) METHODS AND APPARATUS FOR STORING COLLECTED NETWORK MANAGEMENT DATA

(75) Inventors: Anoop George Ninan, Milford, MA (US); Samuil Shmuylovich, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1423 days.

(21) Appl. No.: 11/476,478

(22) Filed: Jun. 28, 2006

(51) Int. Cl.
*G06F 12/00* (2006.01)
*G06F 3/00* (2006.01)
*G06F 15/16* (2006.01)

(52) U.S. Cl. .................. 711/163; 719/313; 709/203

(58) Field of Classification Search ............ 707/1, 10; 709/223, 203; 719/310, 313; 711/163
See application file for complete search history.

(56) References Cited

U.S. PATENT DOCUMENTS

| | | | | |
|---|---|---|---|---|
| 6,122,639 A * | 9/2000 | Babu et al. | | 1/1 |
| 6,134,559 A * | 10/2000 | Brumme et al. | | 1/1 |
| 6,256,676 B1 * | 7/2001 | Taylor et al. | | 709/246 |
| 6,256,704 B1 * | 7/2001 | Hlava et al. | | 711/112 |
| 6,308,178 B1 * | 10/2001 | Chang et al. | | 707/100 |
| 6,631,374 B1 * | 10/2003 | Klein et al. | | 707/638 |
| 6,738,975 B1 * | 5/2004 | Yee et al. | | 719/310 |
| 6,938,055 B2 * | 8/2005 | Iida et al. | | 707/201 |
| 6,947,939 B2 * | 9/2005 | Fujibayashi et al. | | 701/469 |
| 6,957,234 B1 * | 10/2005 | Steinbach | | 707/201 |
| 7,047,254 B2 * | 5/2006 | Daggett | | 717/108 |
| 7,085,851 B2 * | 8/2006 | Nusbickel et al. | | 709/246 |
| 7,143,008 B2 * | 11/2006 | Ochi et al. | | 702/186 |
| 7,143,153 B1 * | 11/2006 | Black et al. | | 709/223 |
| 7,197,489 B1 * | 3/2007 | Gauvin et al. | | 707/1 |
| 7,260,625 B2 * | 8/2007 | Sugiura et al. | | 709/223 |
| 7,328,406 B2 * | 2/2008 | Kalinoski et al. | | 715/738 |
| 7,356,576 B2 * | 4/2008 | Rabe | | 709/221 |
| 7,426,734 B2 * | 9/2008 | Debique et al. | | 719/310 |
| 7,437,445 B1 * | 10/2008 | Roytman et al. | | 709/223 |
| 7,464,147 B1 * | 12/2008 | Fakhouri et al. | | 709/223 |
| 7,634,583 B2 * | 12/2009 | Sagar et al. | | 709/250 |
| 7,707,586 B2 * | 4/2010 | Smith et al. | | 719/317 |
| 7,962,917 B2 * | 6/2011 | Lawrence et al. | | 719/313 |
| 8,099,736 B2 * | 1/2012 | Hoerle et al. | | 719/313 |
| 2002/0188697 A1 * | 12/2002 | O'Connor | | 709/219 |
| 2002/0196744 A1 * | 12/2002 | O'Connor | | 370/254 |
| 2003/0177239 A1 * | 9/2003 | Shinohara et al. | | 709/226 |
| 2003/0208581 A1 * | 11/2003 | Behren et al. | | 709/223 |
| 2004/0039889 A1 * | 2/2004 | Elder et al. | | 711/162 |
| 2005/0193105 A1 * | 9/2005 | Basham et al. | | 709/223 |
| 2005/0278187 A1 * | 12/2005 | Bobbitt | | 705/1 |
| 2006/0004765 A1 * | 1/2006 | Anderson et al. | | 707/10 |
| 2006/0085166 A1 * | 4/2006 | Ochi et al. | | 702/186 |
| 2006/0085796 A1 * | 4/2006 | Hoerle et al. | | 719/313 |
| 2006/0206903 A1 * | 9/2006 | Lawrence et al. | | 719/313 |
| 2007/0226328 A1 * | 9/2007 | Kusama et al. | | 709/223 |
| 2008/0086285 A1 * | 4/2008 | Gombas et al. | | 702/187 |

\* cited by examiner

*Primary Examiner* — Firmin Backer
*Assistant Examiner* — Michael A Chambers
(74) *Attorney, Agent, or Firm* — Krishnendu Gupta; Gerald P. Kazanjian (57) ABSTRACT

A system provides a store process and method of operation that stores network management data collected from a managed resource by obtaining agent data collected by an agent from a managed resource in a network. The store process populates a set of adapters with the agent data, the set of adapters determined from the agent data collected from the managed resource. Based on the set of adapters populated with the agent data, the store process selects and applies at least one of a plurality of read mechanisms to read corresponding managed object data from a management database into managed objects that are to be synchronized with the agent data collected from the managed resource. The store process then synchronizes the agent data populated in the set of adapters with the managed object data in the management database.

19 Claims, 7 Drawing Sheets

METHODS AND APPARATUS FOR STORING COLLECTED NETWORK MANAGEMENT DATA

BACKGROUND

The rapid expansion of information service and data processing industries has resulted in a need for computer systems to manage and store large amounts of data. As an example, financial service industry businesses such as banks, mutual fund companies or the like often operate complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Components of a typical conventional storage area network implementation include one or more connectivity devices such as high speed data switches that interconnect the various data storage systems to each other and to one or more host or server computer systems (servers) that require access to (e.g., read and/or write) the data in the data storage systems on behalf of client software applications and/or client computer systems to communicate with the servers. A SAN is thus a fabric that routes input/output requests in data access protocols such as SCSI, iSCSI, Fiberchannel, or others from servers through switches to one or more data storage systems for access to data stored in those storage systems.

A developer or administrator of a storage area network environment may install one or more distributed storage area network management software applications within the storage area network to manage or administer the various resources (i.e., devices, computer systems, storage systems, etc.) that operate within the storage area network. A network manager (i.e., a person) responsible for management of the storage area network operates the network management software application to perform management tasks such as performance monitoring, network analysis, remote configuration, storage provisioning and other administration of the various resources operating within the storage area network.

A typical conventional storage area network management software application may have several different software components or processes that execute independently of each other in a distributed manner on different computer systems but that collectively interoperate together to perform network management. As an example, conventional designs of storage area network management applications can include console, server, agent and storage or database management software components or processes that each performs a specific role in storage area network management.

Generally, the server component or process operates as a central control process within the storage area network management application and coordinates communication between the console, storage and agent components. The console component or process often executes within a dedicated storage area network management workstation to allow a network administrator (i.e., a person or people responsible for management of the storage area network) to visualize and remotely control and manage the various components within the storage area network that are displayed on a graphical user interface within a display on the console computer system. Agent components or processes execute on the various host computer systems such as servers distributed throughout the storage area network to manage various types of storage area network resources.

As an example, there may be different respective agents specifically designed (e.g., coded in software) to remotely manage, control and collect data from data storage system resources, database applications, switches, and so forth. Agents receive remote management commands from the server (i.e., via a user at the console controlling the server) and apply functionality associated with those management commands to the managed resources within the storage area network for which those agents are designated to manage. Agents are also responsible for periodically (e.g. nightly) collecting configuration or management data concerning the storage area network resources that those agents are responsible for managing. As an example, an agent that is responsible for monitoring and control of a large data storage disk array system might be configured to collect management data from that storage array on a nightly basis. This agent data collection process might include communicating with the storage array to query the array for information concerning all devices (e.g. logical storage devices) configured at that time within the array. This may result in the collection of large amounts of management data from certain managed SAN resources, such as large storage array in which there can be many thousands of devices configured for operation. The management data collected from the agent is also known as agent data.

Agents transmit this collected agent data back to an assigned storage component, also known as a store process. The store process receives the collected agent data from the agent and processes and stores this information into a storage area network management database for access by the server and console components. The management database thus provides managed object data (i.e., agent data that has been stored in the management database) for all managed resources in the SAN. The console component can interact with the server component to obtain current network information such as performance, capacity, load or other data concerning managed resources within the storage area network by accessing the managed object data maintained in this manner within the network management database.

SUMMARY

Conventional mechanisms and techniques for managing the collection and processing of management data for managed resources by network management applications suffer from a variety of deficiencies. In particular, the design of conventional network management applications often uses a large number of agent components that each remotely operate to periodically collect sets of management data from the managed resources that those agents manage. After collection, each agent is responsible for transmitting the collected set of management data to a store process that processes the management data for storage into a management database or other accessible management data repository. Depending upon the type and complexity of the resource from which the data was collected, the processing tasks involved with collecting and processing management data received from agents by store processes that store this data within the centralized network management database can consume significant processing resources. No mechanism exists in conventional management applications to greatly reduce this burden and make store processing of agent data more efficient.

Specifically, in conventional network management application implementations, for a particular managed resource (e.g., a data storage system), an agent responsible to interact with that managed resource collects and forwards management data associated with that data storage system to the store process for placement into the management database. The store process receives the entire set of collected management data and converts each field of this data from one data type or arrangement to another and then places this data into the network management database. This conventional post-processing operation of management data can involve parsing, converting and mapping the entire set of collected management data for placement into data structures such as objects corresponding to the managed entities in the storage area network. Conventional mechanisms for performing the processing are inefficient and little effort has been undertaken in conventional management application system designs to streamline or standardize this process.

In particular, for new types of managed resources, agent designers and developers must create an agent data structure from scratch that will be used to transfer of management data collected by the agent (i.e., agent data) for transmission to a store process. Likewise, the store process itself must be modified to be able to processes each newly created agent data structure for each new type of networked managed resource (e.g. each new device that must be managed in a network). Conventional network management applications do not provide a store process framework that simplifies the process of developing new agent data structures for processing of management data collected from the newly defined managed resources operating in a storage area network. Furthermore, conventional store processing techniques are not efficient at managing the process of reading existing data from a management database for replacement by newly collected agent data. By performing this processing inefficiently, conventional store process techniques used by network management applications incurred increased overhead.

Embodiments disclosed herein operate to significantly overcome these and other deficiencies associated with conventional mechanisms and techniques for processing of management data in a network management application. In particular, embodiments provide a store process framework that provides for an efficient method for processing and storing network management data colleted from a managed resource by an agent. The framework provides a set of adapter classes that allow store processing to efficiently process agent data collected from managed resources. During operation of the store process disclosed herein, the store process obtains agent data collected by an agent from a managed resource in a network and populates a set of adapters with the agent data. The store process determines the set of adapters to be instantiated from the agent data collected from the managed resource. In particular, the store process identifies and instantiates at least one type adapter associated with the agent data collected from the managed resource. As an example, the type adapter may correspond to a resource such as a storage array from which the agent data was collected.

For each type adapter, the framework provides instance adapters and the store process instantiates at least one associated instance adapter to contain agent data associated with that type adapter. In this manner, instance adapters operate as containers for the collected management data and are associated to type adapters that correspond to managed resources from which that agent data was collected. The store process can validate the data within the instance adapters to be certain that the data is complete for processing into a managed object database access by the network management application. By performing validation, the store process ensures that cumbersome database access operations are avoided in situations when agent data is corrupted or incomplete in some manner.

Assuming the validation succeeds, the store process begins the operation of storing the agent data as managed object data within the management database maintained by the network management application. To do so, based on the set of adapters populated with the agent data, the store process selects and applies at least one of a plurality of read mechanisms to read corresponding managed object data from a management database into managed objects that are to be synchronized with the agent data collected from the managed resource. In one configuration, the read mechanism invoked on each type adapter is a read mechanism that most efficiently reads data from the managed object database for synchronization with the agent data in the instance adapters associated with that type adapter. Depending on various situations, different read mechanisms may be more or less efficient then others. In one configuration, the store process selects a read mechanism for invocation from the plurality of read mechanisms that include: i) a read-individual mechanism that reads managed object data from the management database corresponding to a single managed object; ii) a read-all mechanism that reads managed object data from the management database corresponding to all managed objects associated with the type adapter; iii) a read-chunk mechanism that reads a subset of managed object data from the management database; and iv) a read-logical-partition mechanism that reads managed object data from the management database corresponding to a logical partition of managed object data. To be most efficient, the store process selects a read mechanism that reads only managed object data that corresponds to the agent data.

Using the selected read mechanism, the store process reads from the management database and stores the managed object data read from the management database using the invoked read mechanism in a managed object structure for comparison with the agent data maintained in the instance adapters. Using the agent data being maintained in the instance adapters and the managed object data being maintained in memory from application of the read mechanism, the store process thereafter synchronizes the agent data populated in the set of adapters with the managed object data in the management database.

In one configuration, the store process creates new managed objects for agent data stored in instance adapters that does not have corresponding managed object data read from the management database. Additionally, the store process deletes managed objects for which managed object data was read from the management database but for which there is no corresponding agent data maintained in at least one instance adapter. The store process also associates specific instance adapters containing agent data that map to specific managed objects read from the management database using key information that is common between the agent data and object data read from the database. Once instance adapters are matched to managed object structures, the store process copies properties of each instance adapter that maps to a specific managed object into corresponding properties of that managed object. Thereafter, the store process commits the managed object data in the managed objects to the management database. In this manner, embodiments disclosed herein provided an efficient framework for store processing.

Other embodiments include computer systems and operate according to the aforementioned processing methods and operations as well as software programs embodied within computer readable mediums that performance as such.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Generally, embodiments disclosed herein provide mechanisms and techniques for processing management data for use, for example, within a computer system or network management application. In particular, network management applications such as those used in management of storage area networks, for example, operate agent and store processes configured to allow the network management application to perform periodic collection of data concerning managed entities or resources under the control or management of the network management application. In such systems, agents perform the data collection of management data in an "agent data" format from managed resources. The agents then transfer the collected agent data to store processes for placement into a management database or other repository for access by the network management application in order to allow a network administrator operating the network management application to be able to manage those managed resources to which the agents are assigned. A store process configured in accordance with the framework disclosed herein operates to efficiently mange the process of storing the agent data into the management database as managed object data.

Figure 1:
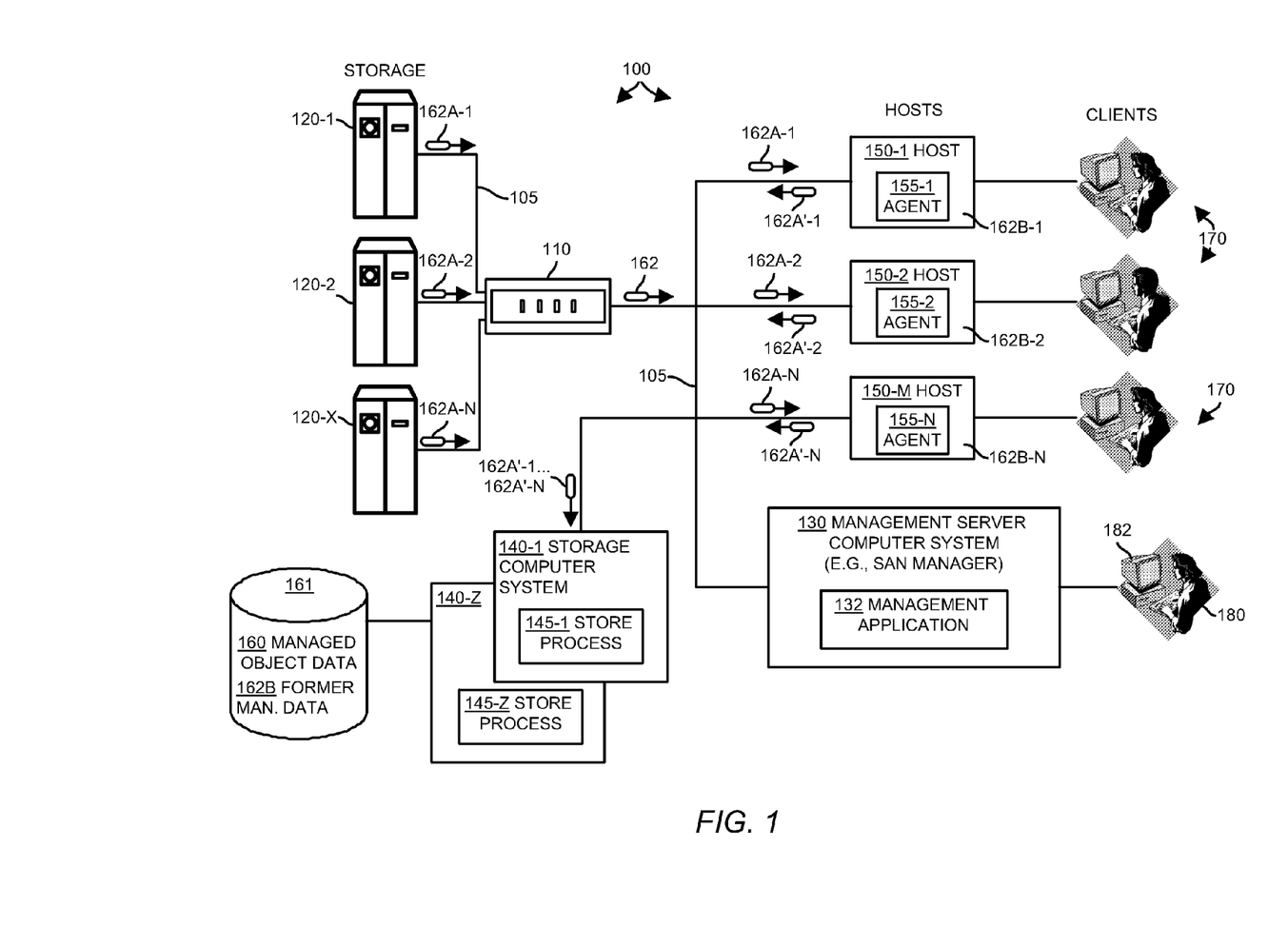
FIG. 1 illustrates an example storage area network and computing system environment including a store processes configured to operate according to embodiments disclosed herein.

FIG. 1 illustrates an example of a networking environment suitable for use in explaining example embodiments. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 150-1 through 150-M. According to the general operation of the storage area network shown in FIG. 1, client computer systems 170 can operate various client software applications (not specifically shown) that communicate with server applications (not specifically shown) operating within the host computer systems 150 in order to access data stored within the data storage systems 120 over the storage area network 100. The system disclosed herein is concerned with management of the various hosts 150, switches 110, and data storage systems 120 with a network management application 132 that includes store processes 145 and agent processes 155.

Figure 2:
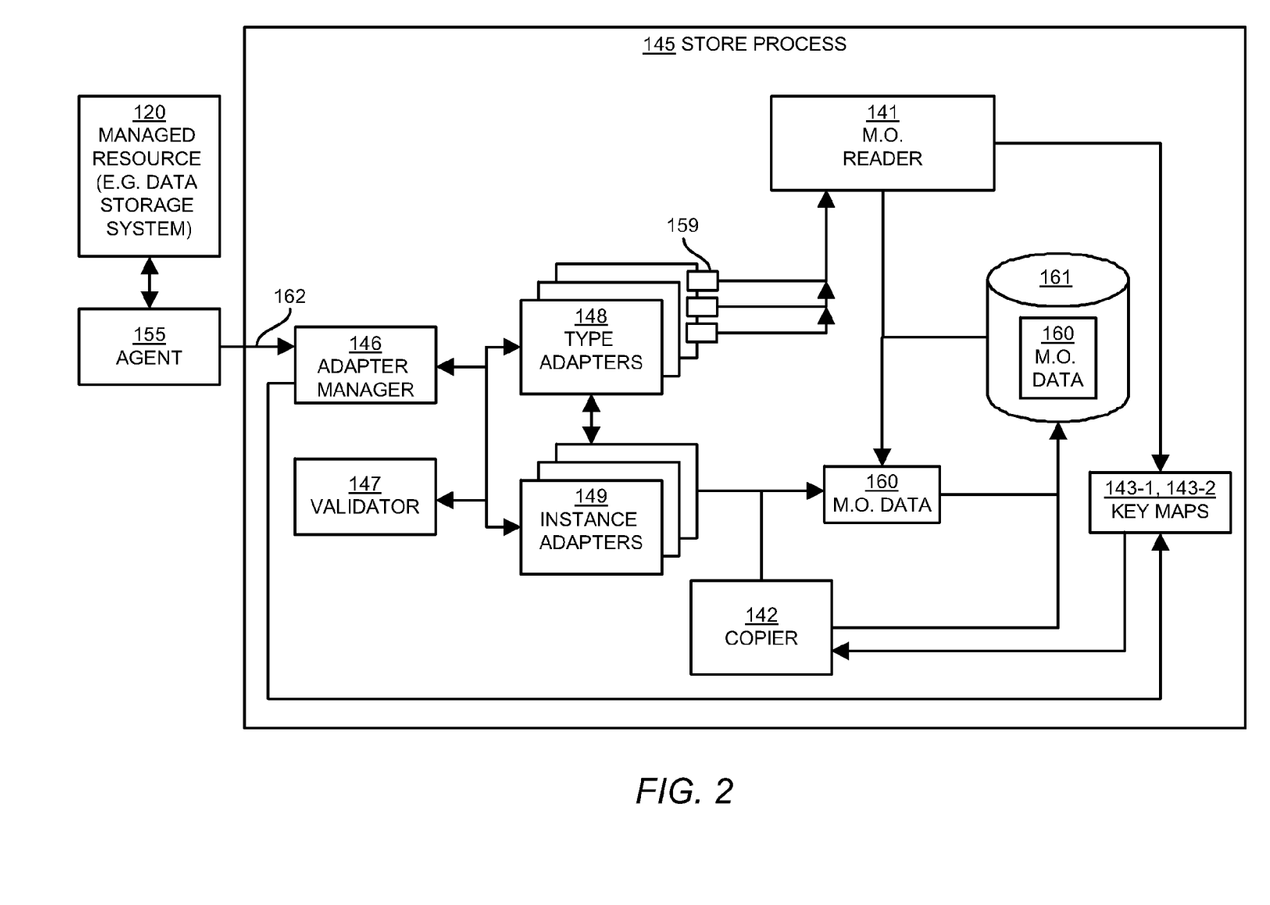
FIG. 2 illustrates an example architecture of a store process configured to operate according to embodiments disclosed herein.

More specifically, in this example storage area network 100 is a management server computer system 130 that operates the network management application 132. In addition, the storage area network 100 includes one or more storage computer systems 140-1 through 140-Z that operate respective store processes 145-1 through 145-Z configured in accordance with the framework disclosed herein. A plurality of agent software processes 155-1 through 155-N operate within one or more of the host computer systems 150-1 through 150-M to periodically collect agent data 162 from managed resources such as the data storage systems 120, connectivity device 110 and hosts 150 (or any other managed resources that may operate in the SAN 100. The agents 155 process the collected agent data (e.g. to determine changes from the time of last collection) and then transmit the collected agent data to the store processes 145. Generally, the agents 155 and store processes 145 interoperate with, and are collectively considered parts of the management application 132. A network administrator 180 interacts via a console computer system 182 with the management application 132 executing on the management server computer system 130 in order to remotely administer manageable entities within the storage area network 100 such as the data storage systems 120, the connectivity devices 110 and the host computer systems 150. Embodiments disclosed herein relate to the processing performed by the store processes 145 to collect and process agent data 162 collected by agents 155 from managed entities (e.g., 120 and/or 110 and others not specifically shown) for placement into the management database 161 as managed object data 160 for access by the management application 132. FIG. 2 illustrates a more detailed view of processing performed according to store processes 145.

FIG. 2 is a block diagram of an example store process 145 architecture that operates in accordance with example embodiments disclosed herein. Generally, as shown in this example, the agent 155 collects agent data 162 from a managed resource 120, that in this example is a storage array operating in a storage area network 100. The agent 155 transmits the agent data 162 to the store process 145 for receipt by an adapter manager 146. The agent data 162 may be encapsulated in a predefined data format. The adapter manager 146 is able to analyze the agent data 162 to identify which managed resource 120 the agent data 162 was collected from by the agent 155. From this analysis, the adapter manager 146 can instantiate a set of adapters including type adapters 148 and instance adapters 149 and can further instantiate the agent data 162 into appropriate instance adapters 149 as will be explained more detail. The type adapters 148 generally correspond to various resources for which the agent data 162 was collected in the instance adapters 149 serve as containers to maintain the specific contents, values or properties contained within the collected agent data 162 for those resources. During the process of populating the adapters with agent data 162, the adapter manager 146 creates an instance adapter map 143-1 to identify specific key information within fields of the agent data 162 that correspond to key information within managed object data 160 maintained in the management database 161.

After the adapter manager 146 has instantiated the appropriate type and instance adapters 148 and 149, the store process 145 operates a validator 147 to validate the data within the instance adapters 149. Validation ensures that the collected agent data 162 is processable for storage within the managed object database 161. Validation can include insuring that all references within agent data have corresponding adapters instantiated so that all relationships between fields of data are present. Assuming validation is successful (if it is not, the processing aborts), the store process 145 operates a managed object reader 141 to read managed object data 160 from the management database 161. During reading of the managed object data 160, the managed object reader 141 creates a managed object data key map 143-2 that identifies keys within specific managed object 160. The managed object data 160 that is read from the management database 161 represents management data that is to be updated with the most recently collected agent data 162 that resides in the instance adapters 149.

After reading the managed object data 160, the store process 145 operates a copier 142 to associate the agent data maintained within the instance adapters 149 with the managed object data 160 read from the management database 161. This processing uses the key maps 143-1 and 143-2 and can include creation of new managed objects 160 or deletion of old managed objects 160 that are no longer represented or reflected within the agent data 162 in the instance adapters 149. Additionally, the copier 142 establishes any required relationships and copies the properties of matching instance adapters 149 to the appropriate managed object 160. The copier 142 accesses the mass 143 to complete this process. After the copy processes complete, the copier 142 causes the newly updated managed object data 160 (i.e., now updated with the agent data 162 in the store process 145) to be committed for storage within the management database 161. Further details of the processing in accordance with example embodiments will now be described in a series of flowcharts.

Figure 3:
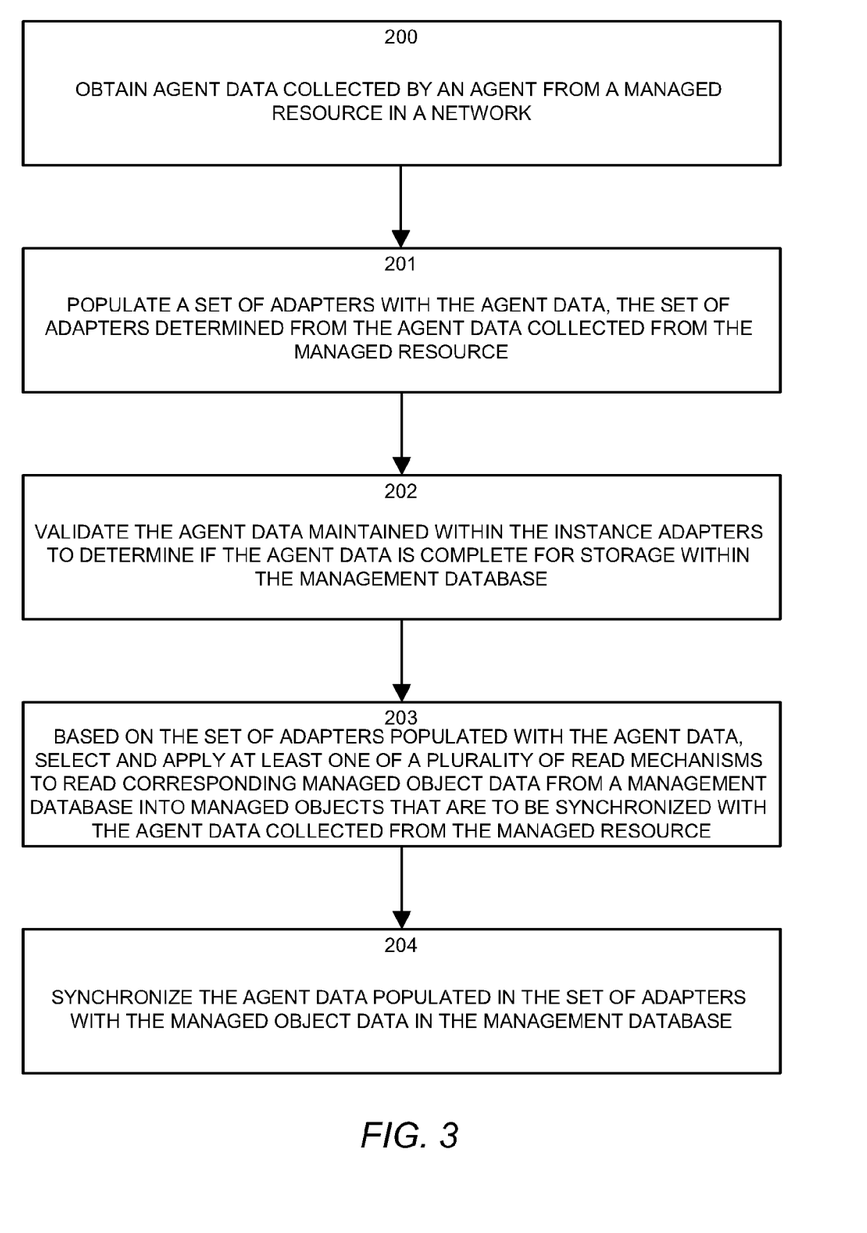
FIG. 3 is a flow chart of processing steps that show the general operation of a store process configured to process management information according to embodiments disclosed herein.

FIG. 3 is a flowchart of processing steps that a store process 145 performs to store network management data colleted from managed resource in accordance with an example embodiments disclosed herein.

In the step 200, the store process 145 obtains agent data 162 collected by an agent 145 from a managed resource 120 (e.g., a data storage system) in a network. The agent 145 may collect the agent data 162 from any type of managed resource such as a large disk array data storage system, host computer system, connectivity device or the like.

In the step 201, the store process 145 populates a set of adapters 148 and 149 with the agent data 162. The store process 145 determines the specific set of adapters to be instantiated from the agent data 162 collected from the managed resource (a data storage system 120 in this example). This process includes, in one configuration, ordering a set of adapters to allow efficient reading all related objects from a source or parent object.

In the step 202, the store process 145 validates the agent data maintained within the instance adapters 149 using, for example, to determine if the agent data is complete and acceptable (i.e., error-free) for storage within the management database 161. By validating the agent data prior to reading managed object data 160 from the management database 161, if the agent data contains problems, the transaction can be aborted without incurring the performance penalty of database accesses.

In the step 203, based on the set of adapters populated with the agent data, the store process 150 selects and applies at least one of a plurality of read mechanisms 159 (implemented by the type adapters 148) to read corresponding managed object data 160 from a management database 161 into managed objects 160 that are to be synchronized with the agent data 162 collected from the managed resource 120. By providing different read mechanisms 159, the most efficient read mechanisms can be selected depending upon the configuration of the instance adapters 149. As an example, the agent data 162 is data performed upon an initial discovery of a new managed resource 120 that is a large data storage system containing potentially thousands of devices, the agent data 162 may be very large. In such a case, a read mechanism 159 that reads an entire set of managed object data 160 (e.g. read-all) corresponding to all managed objects associated with a type adapter 148 may be the best read mechanism 159 to apply as opposed to reading individual managed object data 160 on a device by device basis (e.g. a read-individual read mechanisms 159) that uses separate queries to the management database 161 for each portion of managed object data for each device. In this manner, configurations of the store framework disclosed herein can select from a variety of different read mechanisms depending upon different data scenarios to most efficiently read managed object data 160 from the management database 161 while reducing or minimizing the performance hit required for database access. Examples of other read mechanisms 159 that will be explained more detail include a read-chunk mechanism that reads a subset of managed object data and a read-logical-partitioned mechanism that reads a logical partition of managed object data 160.

In the step 204, the store process 145 synchronizes the agent data populated in the set of adapters 149 with the managed object data 160 in the management database. Synchronizing the collected agent data 162 with the managed object data 160 can include identifying managed objects to be created into needed and can use mapping information 143 to map properties of instance adapters 149 that maps to existing managed objects 160. Further details of processing associated with population of adapters, reading of managed object data 160, and synchronization of agent data in the instance adapters with managed object data in the management database 161 will be explained with respect to flowcharts of processing steps in FIGS. 4 through 6.

Figure 4:
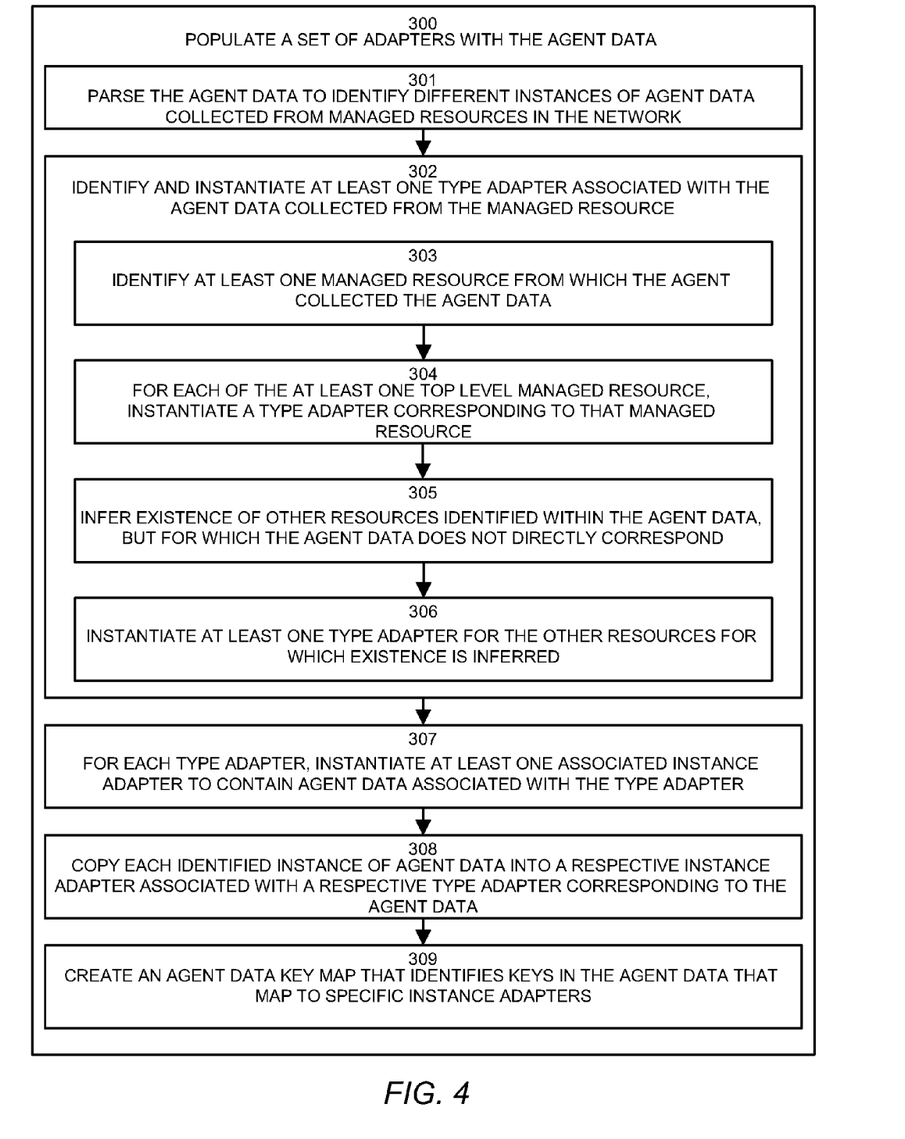
FIG. 4 is a flow chart of processing steps that show operation of populating adapters with agent data according to embodiments disclosed herein.

FIG. 4 is a flowchart of processing steps that shows details of processing to instantiate and populate a set of adapters 148 and 149 (i.e., object classes) to maintain collected agent data 162 for synchronization with the management database 161.

In the step 300, the store process 145 instantiates and populates a set of adapters 148 and 149 with the agent data 162. Step 301 through 308 show details of this processing.

The step 301, store process 145 parses the agent data 162 to identify different instances of agent data collected from a managed resource 120 in the network 100. The agent data 162 can identify the particular type of managed resource such as a data storage system for which was collected.

Next, in step 302, the store process 145 identifies and instantiates at least one type adapter 148 associated with the agent data collected from the managed resource. Sub-steps 303 through 306 show details of this processing.

In step 303, the store process 145 identifies at least one managed resource from which the agent collected the agent data. In the example shown in FIG. 2, the agent data 162 indicates that the managed resource 120 for which the agent 155 collected the agent data 162 is a disk array storage system. As such, in this example the store process 145 detects an identity of a storage array 120 represented within the agent data 162. The storage array operates within the storage area network 100 in which the agent 155 operates to collect the agent data 162.

In step 304, for each of managed resource, the store process 145 instantiates a type adapter 148 corresponding to that managed resource, as identified by the agent data 162.

In step 305, the store process 145 infers existence of other resources identified within the agent data 162, but for which the agent data does not directly correspond. As an example, the agent data 162 may contain references to other managed resources 120 such as other disk array storage systems that are different from the disk array storage system 120 for which the agent 155 collected the agent data 162.

In step 306, the store process 145 instantiates at least one type adapter for the other resources for which existence is inferred. In this manner, the set of type adapters 148 that gets instantiated is complete and includes a type adapter 148 for all possible managed resources that might be referenced within the agent data 162.

In step 307, once all type adapters 148 have been instantiated, the store process 145 enters a processing operation that occurs for each type adapter and that instantiates at least one associated instance adapter 149 to contain agent data 162 (or a relationship derived from analysis of the agent data 162) associated with the type adapter 148.

In step 308, the store process 145 copies each identified instance (e.g. each field) of agent data into a respective instance adapter 149 associated with a respective type adapter 148 corresponding to the agent data. In this manner, all agent data 162 is stored within respective instance adapters 149.

In step 309, the store process creates an agent data key map 143-1 that identifies keys in the agent data 162 that map to specific instance adapters 149.

Figure 5:
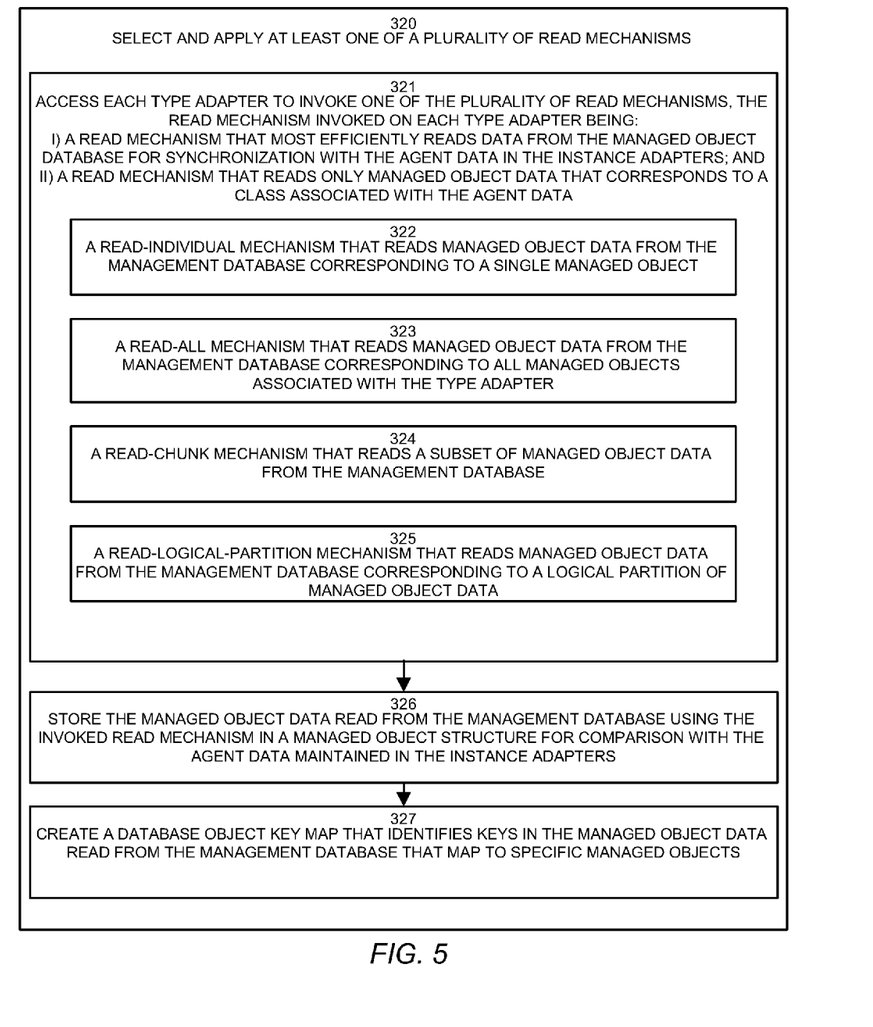
FIG. 5 is a flow chart of processing steps that show details of operation reading managed object data from a management database for updating with agent data according to embodiments disclosed herein.

FIG. 5 is a flowchart of processing steps that show details of processing to obtain managed under data 160 in the management database 161 that is thereafter updated with the agent data 162.

In step 320, the store process 145 selects and applies at least one of a plurality of read mechanisms to read corresponding managed object data 160 from a management database 161 into managed objects 160 (i.e., in memory) that are to be synchronized with the agent data 162 (i.e. now in the instance adapters 149) collected from the managed resource 120. Steps 321 through 327 show details of this processing.

In step 321, the store process 145 accesses each type adapter 148 to invoke one of the plurality of read mechanisms 159. The read mechanisms 159 invoked on each type adapter 148 are read mechanisms that most efficiently read data from the managed object database 161 for synchronization with the agent data 162 in the instance adapters. Additionally, the read mechanisms 159 invoked by the store process 145 read only managed object data 160 that corresponds to a class (i.e. the type adapter 148) associated with the agent data 162 collected. This makes read processing efficient by not reading more managed object data 160 then is necessary. Sub-steps 322 through 325 show various read mechanisms that can be invoked or applied to access managed under data 160 from the management database 161.

In step 322, the store process 145 can select a "read-individual" mechanism that reads managed object data 160 from the management database 161 corresponding to a single managed object associated with the type adapter 148. This read mechanism may be efficient when the agent data 162 only contains a small amount of data.

In step 323, the store process 145 can select a "read-all" mechanism that reads all managed object data 160 from the management database corresponding to all managed objects associated with the type adapter 148. This is useful and efficient in scenarios in which the agent data 162 contains a complete set of data related to a managed resource 120.

In step 324, the store process 145 can select a "read-chunk" mechanism that reads managed object data from the management database corresponding to a subset of managed object data. By being able to read certain subsets of the database 161, efficiency of database queries is achieved.

In step 325, the store process 145 can select a "read-logical-partition" mechanism that reads managed object data 160 from the management database corresponding to a logical partition of managed object data in the management database.

In step 326, the store process 145 stores (i.e., in memory) the managed object data 160 read from the management database 161 using the specific invoked read mechanism 159 in a managed object structure (managed object data 160 in the store process 145) for comparison with the agent data 162 maintained in the instance adapters 149.

In step 327, the store process creates a database object key map 143-2 that identifies keys in the managed object data 160 read from the management database that map to specific managed objects 160. At this point in processing then, the store process 145 has accessed the relevant managed object data 160 from the management database 161 that is to be updated with the agent data that is maintained in the instance adapters 149 and has created a key map 143-2 that indicates database keys that map to those managed object 160.

Figure 6:
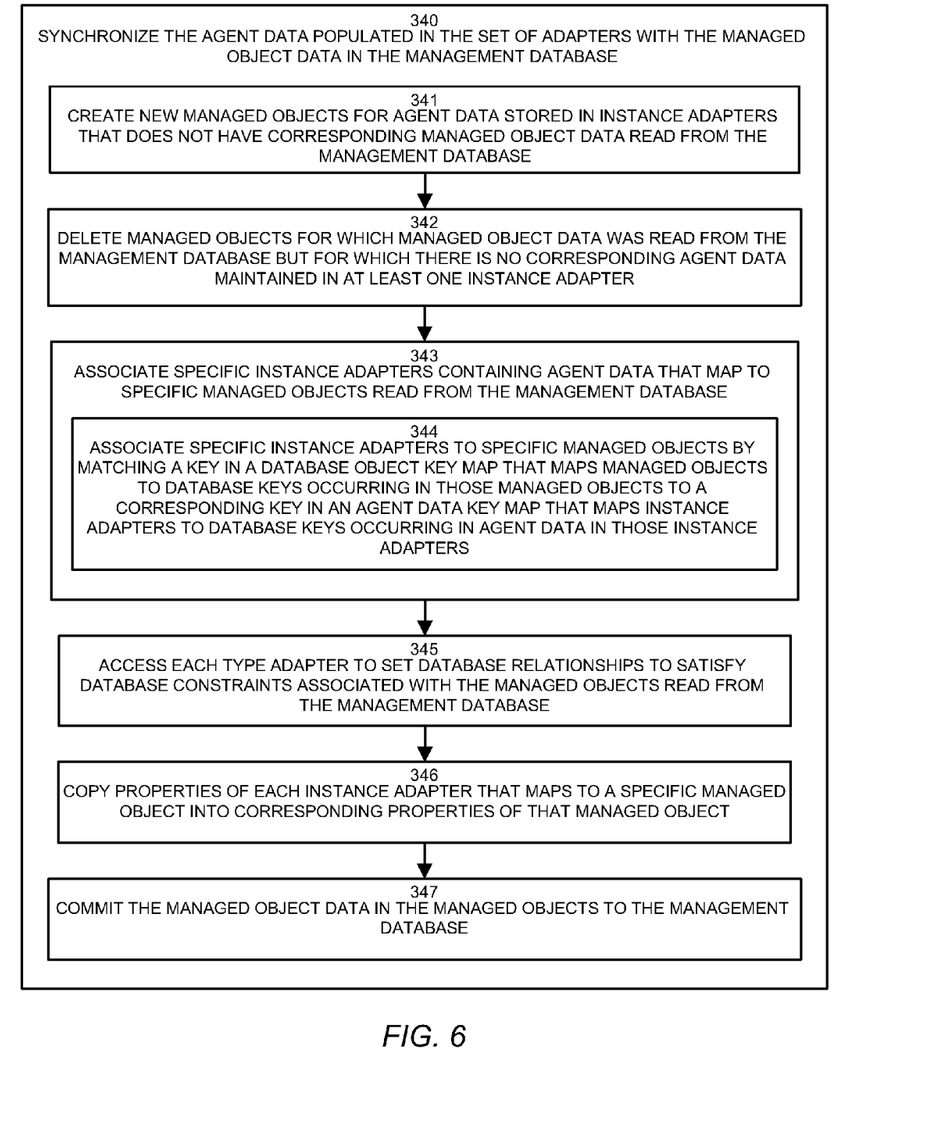
FIG. 6 is a flow chart of processing steps that show details of processing to synchronize agent data in instance adapters with managed object data according to embodiments disclosed herein.

FIG. 6 is a flowchart of processing steps that show details of processing by the store process 145 to synchronize the agent data 162 populated in the set of instance adapters 149 with the managed object data 160 that will then be stored in management database 161.

In step 340, the store process 145 synchronizes the agent data populated in the set of adapters 148, 149 with the managed object data 160 in the management database 161 by performing the sub-steps 341 through 347.

In step 341, the store process 145 creates new managed objects 160 for agent data stored in instance adapters 149 that do not have corresponding managed object data read from the management database 161. This allows any new objects represented within the agent data 162 to be instantiated as managed objects 160.

In step 342, the store process 145 deletes managed objects 160 for which managed object data 160 was read from the management database 161 but for which there is no corresponding agent data 162 maintained in at least one instance adapter 149. Accordingly, if a managed resource 120 now contains less managed resources and promenade prior collection of data, the store process 145 causes the management database 161 to be updated by removing those managed objects 160.

In step 343, the store process 145 associates specific instance adapters 149 containing agent data that map to specific managed objects 160 read from the management database 161. Details of the step are shown in step 344.

In step 344, the store process 145 associates specific instance adapters 149 to specific managed objects 160 by matching a key in a database object key map 143-2 that maps managed objects to database keys occurring in those managed objects to a corresponding key in an agent data key map 143-1 that maps instance adapters 149 to database keys occurring in agent data maintained in those instance adapters 149. In this manner, specific instance adapters 149 to be associated to specific instances of managed object data 160 read from the management database 161.

In step 345, the store process 145 accesses each type adapter 149 to set database relationships to satisfy database constraints associated with the managed objects read from the management database.

Next, in step 346, the store process 145 copies properties of each instance adapter 149 that maps to a specific managed object 160 into corresponding properties of that managed object 160.

Finally, in step 347, the store process 145 commits the managed object data 160 in the managed objects to the management database 161 for storage.

In this manner, the framework described above provided efficient mechanism for storage of agent data 161 collected from managed resources 120 into a management database 161 for accessed by the network management application 132.

Figure 7:
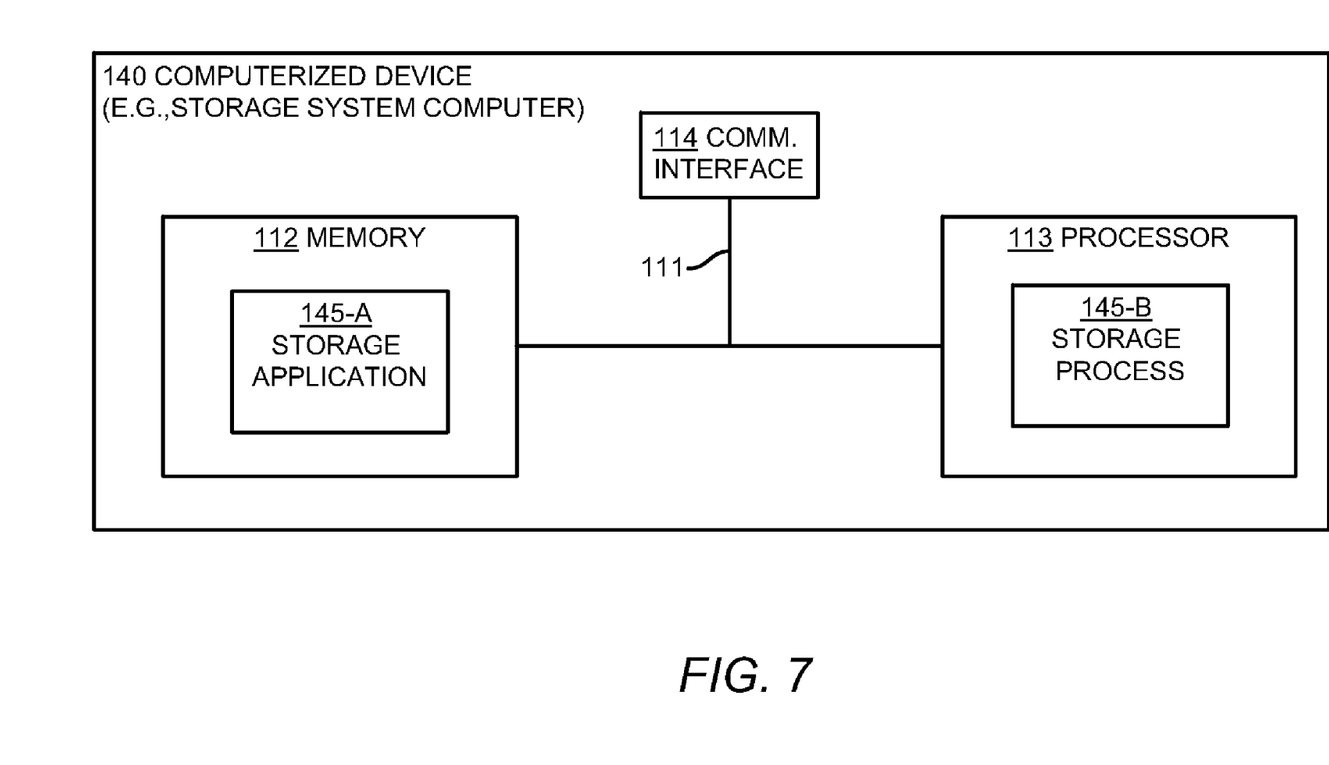
FIG. 7 illustrates an example computer system architecture for either a host computer system that operates an agent or a storage computer system that operates a store process in accordance with embodiments disclosed herein.

FIG. 7 illustrates an example architecture of a computer system that is configured as a storage computer system 140. The computer system 140 may be any type of computerized system such as a personal computer, workstation, portable computing device, mainframe, server or the like. In this example, the computer system 140 includes an interconnection mechanism 111 that couples a memory system 112, a processor 113, and a communications interface 114. The communications interface 114 allows the computer systems 140 and 150 to communicate with each other over the storage area network 100.

The memory system 112 may be any type of computer readable medium that is encoded with an application 145-A that represents software code such as data and/or logic instructions (e.g., stored in the memory or on another computer readable medium such as a disk) that embody the processing functionality of embodiments of the store process 145 as explained above. The processor 113 can access the memory system 112 via the interconnection mechanism 111 in order to launch, run, execute, interpret or otherwise perform the logic instructions of the application 145 (for the storage computer) in order to produce a corresponding store process 145-B. In other words, the store processes 145-B represents one or more portions of the storage application 145-A1 performing within or upon the processor 113 in the computer system.

Is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments of the invention can provide the applications operating within the processor 113 as the processes. While not shown in this example, those skilled in the art will understand that the computer system may include other processes and/or software and hardware components, such as an operating system, which have been left out of this illustration for ease of description.

Other alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software development and computer-related technologies will understand that there can be many ways and orders of representing the processing operations explained above and such alternative software code will still achieve the overall effects explained herein. In addition, embodiments of the invention are not limited to operation on the computer systems shown above. The agents, store processes and management server (including change manager) can operate on shared computing resources, or can be distributed among any number of computer systems. Furthermore, embodiments of the invention are not limited to operation in a storage area network management application, but are intended to be generally applicable to any type of network management application. Accordingly, embodiments of the invention are not limited to the processing arrangements explained above.

Other arrangements of embodiments of the invention that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides a associated operations of the store process, as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

Software processes that operate in a collection of computerized devices, such as in a group of storage area network management servers, hosts or other entities can also provide the system of the invention. The system of the invention can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

What is claimed is:

1. A method for storing network management data collected from a managed resource, the method comprising:
   obtaining agent data from an agent executing on a remote host computer system, the agent data collected by the agent from a managed resource in a network;
   determining a set of adapters according to the agent data, each adapter in the set of adapters configured to process the agent data, the set of adapters including type adapters and instance adapters;

populating the set of adapters with the agent data, comprising:
  identifying and instantiating at least one type adapter associated with the agent data; and
  for each type adapter of the at least one type adapter, instantiating at least one associated instance adapter to contain the agent data associated with the type adapter;
based on the set of adapters populated with the agent data, selecting and applying at least one of a plurality of read mechanisms to read corresponding managed object data from a management database into managed objects configured to be synchronized with the agent data; and
synchronizing the agent data populated in the set of adapters with the managed object data in the management database.

2. The method of claim 1 wherein identifying and instantiating at least one type adapter associated with the agent data collected by the agent from the managed resource in the network comprises:
  identifying at least one managed resource from which the agent collected the agent data;
  for each of the at least one managed resource, instantiating a type adapter corresponding to that managed resource;
  inferring existence of other resources identified within the agent data, but for which the agent data does not directly correspond; and instantiating at least one type adapter for the other resources for which existence is inferred;
  wherein identifying at least one managed resource associated with the agent data comprises:
    detecting an identity of a storage array represented within the agent data, the storage array operating within a storage area network in which the agent operates to collect the agent data.

3. The method of claim 1 wherein populating the set of adapters with the agent data collected by the agent from the managed resource in the network comprises:
  parsing the agent data to identify different instances of agent data collected from managed resources in the network;
  copying each identified instance of agent data into a respective instance adapter associated with a respective type adapter corresponding to the agent data;
  creating an agent data key map that identifies keys in the agent data that map to specific instance adapters;
  ordering the set of adapters to enable efficient reading of corresponding managed object data from the management database; and
  validating the agent data maintained within the instance adapters to determine if the agent data is complete for storage within the management database;
  wherein the management database contains multiple agent data structures, each agent data structure corresponding to a known managed resource; and
  wherein the agent data collected by the agent from the managed resource includes agent data that does not correspond to an agent data structure existing within the management database.

4. The method of claim 1 wherein selecting and applying at least one of a plurality of read mechanisms to read corresponding managed object data from a management database into managed objects configured to be synchronized with the agent data collected by the agent from the managed resource in the network comprises:
  accessing each type adapter to invoke one of the plurality of read mechanisms, the read mechanism invoked on each type adapter being:
    i) a read mechanism that most efficiently reads data from the managed object database for synchronization with the agent data in the instance adapters; and
    ii) a read mechanism that reads only managed object data that corresponds to a class associated with the agent data; and
  storing the managed object data read from the management database using the invoked read mechanism in a managed object structure for comparison with the agent data maintained in the instance adapters.

5. The method of claim 4 wherein accessing each type adapter to invoke one of the plurality of read mechanisms comprises:
  selecting a read mechanism for invocation from the plurality of read mechanisms that include:
    i) a read-individual mechanism that reads managed object data from the management database corresponding to a single managed object;
    ii) a read-all mechanism that reads managed object data from the management database corresponding to all managed objects associated with the type adapter;
    iii) a read-chunk mechanism that reads a subset of managed object data from the management database; and
    iv) a read-logical-partition mechanism that reads managed object data from the management database corresponding to a logical partition of managed object data.

6. The method of claim 4 further comprising:
  creating a database object key map that identifies keys in the managed object data read from the management database that map to specific managed objects.

7. The method of claim 1 wherein synchronizing the agent data collected by the agent from the managed resource in the network populated in the set of adapters with the managed object data in the management database comprises:
  creating new managed objects for agent data stored in instance adapters that does not have corresponding managed object data read from the management database;
  deleting managed objects for which managed object data was read from the management database but for which there is no corresponding agent data maintained in at least one instance adapter;
  associating specific instance adapters containing agent data that map to specific managed objects read from the management database;
  copying properties of each instance adapter that maps to a specific managed object into corresponding properties of that managed object; and
  committing the managed object data in the managed objects to the management database.

8. The method of claim 7 wherein associating specific instance adapters containing agent data that map to specific managed objects read from the management database comprises:
  associating specific instance adapters to specific managed objects by matching a key in a database object key map that maps managed objects to database keys occurring in those managed objects to a corresponding key in an agent data key map that maps instance adapters to database keys occurring in agent data in those instance adapters; and
  accessing each type adapter to set database relationships to satisfy database constraints associated with the managed objects read from the management database.

9. A computerized device comprising:
a memory;
a processor;
a communications interface; and
an interconnection mechanism coupling the memory, the processor and the communications interface;
wherein the memory is encoded with a store process application that executes on the processor as a store process to cause the computerized device to store network management data collected from managed resource, the store process including:
an adapter manager configured to:
obtain, via the communications interface, agent data from an agent executing on a remote host computer system, the agent data collected by the agent from a managed resource in a network;
determine a set of adapters according to the agent data, each adapter in the set of adapters configured to process the agent data, the set of adapters including type adapters and instance adapters; and
populate the set of adapters with the agent data, comprising identifying and instantiating at least one type adapter associated with the agent data and, for each type adapter of the at least one type adapter, instantiating at least one associated instance adapter to contain the agent data associated with the type adapter;
a managed object reader configured to, based on the set of adapters populated with the agent data, select and apply at least one of a plurality of read mechanisms to read corresponding managed object data from a management database into managed objects configured to be synchronized with the agent data; and
a copier configured to synchronize the agent data populated in the set of adapters with the managed object data in the management database.

10. The computerized device of claim 9 wherein the adapter manager comprises:
executable code to parse the agent data to identify different instances of agent data collected from managed resources in the network;
executable code to copy each identified instance of agent data into a respective instance adapter associated with a respective type adapter corresponding to the agent data;
executable code to create an agent data key map that identifies keys in the agent data that map to specific instance adapters; and
executable code to validate the agent data maintained within the instance adapters to determine if the agent data is complete for storage within the management database.

11. The computerized device of claim 9 wherein the managed object reader comprises:
executable code to access each type adapter to invoke one of the plurality of read mechanisms, the read mechanism invoked on each type adapter being:
i) a read mechanism that most efficiently reads data from the managed object database for synchronization with the agent data in the instance adapters; and
ii) a read mechanism that reads only managed object data that corresponds to a class associated with the agent data; and
executable code to store the managed object data read from the management database using the invoked read mechanism in a managed object structure for comparison with the agent data maintained in the instance adapters;
wherein the managed object reader comprises:
executable code that selects a read mechanism for invocation from the plurality of read mechanisms that include:
i) a read-individual mechanism that reads managed object data from the management database corresponding to a single managed object;
ii) a read-all mechanism that reads managed object data from the management database corresponding to all managed objects associated with the type adapter;
iii) a read-chunk mechanism that reads a subset of managed object data from the management database; and
iv) a read-logical-partition mechanism that reads managed object data from the management database corresponding to a logical partition of managed object data; and
executable code to create a database object key map that identifies keys in the managed object data read from the management database that map to specific managed objects.

12. The computerized device of claim 9 wherein the copier comprises:
executable code to creating new managed objects for agent data stored in instance adapters that does not have corresponding managed object data read from the management database;
executable code to deleting managed objects for which managed object data was read from the management database but for which there is no corresponding agent data maintained in at least one instance adapter;
executable code to associate specific instance adapters containing agent data that map to specific managed objects read from the management database;
executable code to copy properties of each instance adapter that maps to a specific managed object into corresponding properties of that managed object; and
executable code to commit the managed object data in the managed objects to the management database.

13. A computer program product including a non-transitory computer-readable storage medium having instructions encoded thereon to store network management data collected from a managed resource by causing a computer system to perform operations of:
obtaining agent data from an agent executing on a remote host computer system, the agent data collected by the agent from a managed resource in a network;
determining a set of adapters according to the agent data, each adapter in the set of adapters configured to process the agent data, the set of adapters including type adapters and instance adapters;
populating the set of adapters with the agent data, comprising:
identifying and instantiating at least one type adapter associated with the agent data; and
for each type adapter of the at least one type adapter, instantiating at least one associated instance adapter to contain the agent data associated with the type adapter;
based on the set of adapters populated with the agent data, selecting and applying at least one of a plurality of read mechanisms to read corresponding managed object data from a management database into managed objects configured to be synchronized with the agent data; and synchronizing the agent data populated in the set of adapters with the managed object data in the management database.

14. The method of claim 7 wherein selecting and applying at least one of a plurality of read mechanisms to read corresponding managed object data from a management database into managed objects configured to be synchronized with the agent data collected by the agent from the managed resource in the network comprises:
   accessing each type adapter to invoke one of the plurality of read mechanisms, the read mechanism invoked on each type adapter being:
      i) a read mechanism that most efficiently reads data from the managed object database for synchronization with the agent data in the instance adapters; and
      ii) a read mechanism that reads only managed object data that corresponds to a class associated with the agent data; and
   storing the managed object data read from the management database using the invoked read mechanism in a managed object structure for comparison with the agent data maintained in the instance adapters;
   wherein accessing each type adapter to invoke one of the plurality of read mechanisms comprises:
      selecting a read mechanism for invocation from the plurality of read mechanisms that include:
         i) a read-individual mechanism that reads managed object data from the management database corresponding to a single managed object;
         ii) a read-all mechanism that reads managed object data from the management database corresponding to all managed objects associated with the type adapter;
         iii) a read-chunk mechanism that reads a subset of managed object data from the management database; and
         iv) a read-logical-partition mechanism that reads managed object data from the management database corresponding to a logical partition of managed object data.

15. The method of claim 14, wherein populating the set of adapters with the agent data collected by the agent from the managed resource in the network comprises:
   parsing the agent data to identify different instances of agent data collected from managed resources in the network;
   copying each identified instance of agent data into a respective instance adapter associated with a respective type adapter corresponding to the agent data; and
   creating an agent data key map that identifies keys in the agent data that map to specific instance adapters;
   wherein identifying and instantiating at least one type adapter associated with the agent data collected from the managed resource comprises:
      identifying at least one managed resource from which the agent collected the agent data;
      for each of the at least one managed resource, instantiating a type adapter corresponding to that managed resource;
      inferring existence of other resources identified within the agent data, but for which the agent data does not directly correspond; and
      instantiating at least one type adapter for the other resources for which existence is inferred.

16. The method of claim 3 wherein populating the set of adapters with the agent data includes:
   identifying and instantiating at least one type adapter associated with the agent data collected from the managed resource;
   for each of the at least one type adapter, instantiating at least one associated instance adapter to contain agent data associated with the type adapter;
   wherein identifying and instantiating at least one type adapter associated with the agent data collected from the managed resource comprises:
      identifying at least one managed resource from which the agent collected the agent data;
      for each of the at least one managed resource, instantiating a type adapter corresponding to that managed resource;
      inferring existence of other resources identified within the agent data, but for which the agent data does not directly correspond; and
      instantiating at least one type adapter for the other resources for which existence is inferred;
   wherein identifying at least one managed resource associated with the agent data comprises:
      detecting an identity of a storage array represented within the agent data, the storage array operating within a storage area network in which the agent operates to collect the agent data.

17. The method of claim 16 wherein selecting and applying at least one of a plurality of read mechanisms to read corresponding managed object data from a management database into managed objects configured to be synchronized with the agent data collected by the agent from the managed resource in the network comprises:
   accessing each type adapter to invoke one of the plurality of read mechanisms, the read mechanism invoked on each type adapter being:
      i) a read mechanism that most efficiently reads data from the managed object database for synchronization with the agent data in the instance adapters; and
      ii) a read mechanism that reads only managed object data that corresponds to a class associated with the agent data;
   storing the managed object data read from the management database using the invoked read mechanism in a managed object structure for comparison with the agent data maintained in the instance adapters; and
   creating a database object key map that identifies keys in the managed object data read from the management database that map to specific managed objects.

18. The method of claim 17, wherein synchronizing the agent data collected by the agent from the managed resource in the network populated in the set of adapters with the managed object data in the management database comprises:
   creating new managed objects for agent data stored in instance adapters that does not have corresponding managed object data read from the management database;
   deleting managed objects for which managed object data was read from the management database but for which there is no corresponding agent data maintained in at least one instance adapter;
   associating specific instance adapters containing agent data that map to specific managed objects read from the management database by associating specific instance adapters to specific managed objects by matching a key in a database object key map that maps managed objects to database keys occurring in those managed objects to a corresponding key in an agent data key map that maps instance adapters to database keys occurring in agent data in those instance adapters;

accessing each type adapter to set database relationships to satisfy database constraints associated with the managed objects read from the management database;

copying properties of each instance adapter that maps to a specific managed object into corresponding properties of that managed object; and committing the managed object data in the managed objects to the management database.

19. The method of claim 18 wherein accessing each type adapter to invoke one of the plurality of read mechanisms comprises:

selecting a read mechanism for invocation from the plurality of read mechanisms that include:

i) a read-individual mechanism that reads managed object data from the management database corresponding to a single managed object;

ii) a read-all mechanism that reads managed object data from the management database corresponding to all managed objects associated with the type adapter;

iii) a read-chunk mechanism that reads a subset of managed object data from the management database; or iv) a read-logical-partition mechanism that reads managed object data from the management database corresponding to a logical partition of managed object data.

* * * * *